C. HALL.
NUT-LOCK.
No. 184,040.   Patented Nov. 7, 1876.
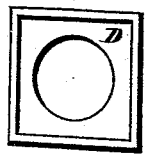
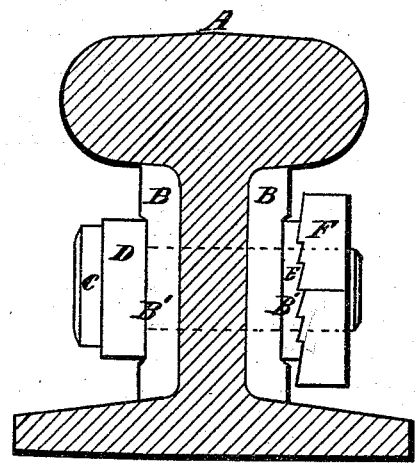
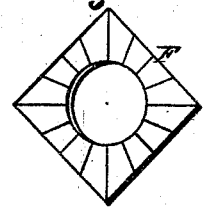
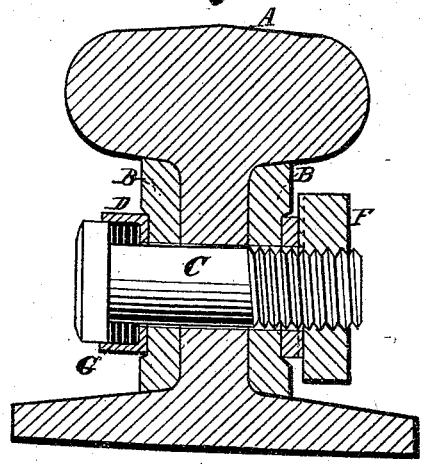
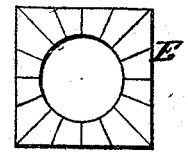
Witnesses:
Henry G. Bull
Fred Horstmann
Inventor.
Chandler Hall

UNITED STATES PATENT OFFICE.

CHANDLER HALL, OF BROOKLYN, NEW YORK.

IMPROVEMENT IN NUT-LOCKS.

Specification forming part of Letters Patent No. 184,040, dated November 7, 1876; application filed September 10, 1875.

*To all whom it may concern:*

Be it known that I, CHANDLER HALL, of Brooklyn, in the county of Kings and State of New York, have invented a new and useful Improvement in Lock-Nuts, of which the following is a specification:

My invention is specially designed for use in securing the sections of rails in railways, but is applicable to various other purposes. It consists in the combination of a screw-bolt, a box-like washer adapted to interlock with one of the parts of a joint (in a railway one of the fish-plates or bars) and with the head of said bolt, a spring interposed between the latter and such box-like washer, another washer adapted to interlock with the other side of the joint, (in a railway the other fish-plate or bar,) and having on its outer side a series of ratchet-shaped teeth or projections, and a nut fitting the screw-bolt, and having on its inner face a series of ratchet-shaped teeth or projections the reverse of those on the last washer, whereby I produce a simple and cheap device, which is absolutely reliable, and hence very valuable for railways, inasmuch as such a fastening is a great desideratum.

The accompanying drawing illustrates my improved lock-nut or fastening applied to a joint between sections of rail forming part of a railway.

Figure I represents a transverse section of a rail, end views of a pair of fish-bars, and a side view of my improved fastening device. Fig. II is another transverse section of such a rail and of a pair of fish-bars, a side view of the screw-bolt, and a transverse section of the other parts of my fastening device. Fig. III is a face view of the washer fitting the head of the bolt; Fig. IV, a face view of the washer with which the nut applied to such bar engages, and Fig. V is a back view of the nut.

Similar letters of reference designate corresponding parts in all the figures.

A designates a rail of a form commonly employed in railways, and B B designate fish-bars used to unite the same with the next section, and having in their outer sides the ordinary longitudinal recesses or shallow grooves B' B'. C is the screw-bolt of my fastening device; D, a box-like or equivalently-shaped washer. In this example of my invention such washer is of rectangular form, and adapted to fit into the aforesaid recess or shallow groove B' in one of the fish-bars B, so as to be prevented from turning, and to receive or interlock with head of the bolt C in such a manner as to obviate its turning. G designates a spring, fitting in the box-like washer D, behind the head of the bolt C. E designates a washer adapted to fit in the recess or shallow groove B' of the other fish-bar B, and having on its face or outer side a series of ratchet-like teeth or projections. F designates the nut that is applied to the screw-bolt C. It has on its back a series of ratchet-teeth or projections, adapted to engage with the series of ratchet-teeth or projections on the washer E when turned backward—*i. e.*, in the direction to detach it from the said bolt C.

To make the joint, the various parts of my improved fastening are arranged as described, and the nut screwed upon the screw-bolt, during which operation the ratchet-teeth or projections of the latter play freely over those on the washer E; but when this is done the nut cannot possibly be turned back by any jarring on the rails, because in this way no tendency to compress the spring G is exerted, for, owing to the perpendicular faces of the ratchet-teeth, the strain is entirely in a circumferential direction. The nut, however, may be readily unscrewed if sufficient pressure in the direction of the length of the bolt C be applied to compress the spring G enough to let the ratchet-teeth or projections of the nut F ride over or pass those of the washer E.

Being absolutely free from all liability to automatically work loose, incident to the jarring of the parts it unites, this fastening is extremely valuable, especially for railways where a parted joint almost certainly entails injury to property, if not loss of life.

What I claim as my invention, and wish to secure by Letters Patent, is—

The combination of the screw-bolt C, the box-like washer D, the spring G, interposed between such washer and bolt-head, the washer E, having on its outer face a series of ratchet-teeth or projections, and the nut F, having on its back a series of ratchet-teeth or projections the reverse of those on the washer E, substantially as and for the purpose herein set forth.

CHANDLER HALL.

Witnesses:
HENRY C. BULL,
FRED. HORSTMANN.